United States Patent [19]

Fischer et al.

[11] Patent Number: 5,104,187
[45] Date of Patent: Apr. 14, 1992

[54] STORAGE ARMREST AND DRINK HOLDER WITH BREAKAWAY HINGE

[75] Inventors: William J. Fischer, Kalamazoo; Ned F. Christiansen, Three Rivers, both of Mich.

[73] Assignee: Lear Seating Corporation, Southfield, Mich.

[21] Appl. No.: 699,497

[22] Filed: May 14, 1991

[51] Int. Cl.⁵ .................................................. A47C 7/62
[52] U.S. Cl. .............................. 297/194; 248/311.2; 248/900
[58] Field of Search .................. 297/194, 188; 108/25, 108/44; 248/311.2, 548, 561, 900; 224/281, 282, 273

[56] References Cited

U.S. PATENT DOCUMENTS

| | | | |
|---|---|---|---|
| 4,645,157 | 2/1987 | Parker | 248/311.2 |
| 4,828,211 | 5/1989 | McConnell et al. | 248/311.2 |
| 4,928,865 | 5/1990 | Lorence et al. | 297/194 X |
| 4,943,111 | 7/1990 | VanderLaan | 297/194 |
| 4,953,771 | 9/1990 | Fischer et al. | 297/194 X |
| 4,981,277 | 1/1991 | Elwell | 248/311.2 |
| 5,007,610 | 4/1991 | Christiansen et al. | 248/311.2 |
| 5,024,411 | 6/1991 | Elwell | 248/311.2 |

Primary Examiner—Laurie K. Cranmer
Attorney, Agent, or Firm—Reising, Ethington, Barnard, Perry & Milton

[57] ABSTRACT

An armrest assembly (10) disposed for use with a vehicle seat assembly (12) includes a lower bin (18) defining a storage compartment (20) and an upper cover (22) pivotally coupled about the bin (18) by a hinge (24) between a closed position covering the lower bin (18) and an open position opening the storage compartment (20). The armrest (10) includes a container support (40) hingedly connected by a support hinge (42) to the armrest (10) and pivotal between a stored position in the compartment (20) and an extended operational position outside the armrest (10). The container support (40) includes a pair of arms (120, 120') defining a pair of openings (132, 132') for receiving at least one beverage container. The arms (120, 120') are independently pivotal (126) to receive different sized containers in each of the openings (132, 132'). The openings (132, 132') further include a pair of slots (142, 142') for receiving a handle of the container. A floor support (150) is spaced below each container opening (132, 132') to support the bottom of the container and retracts into the container support (40) to provide compact storage in the armrest (10). Further, the assembly includes a pair of disconnects (62, 64) disposed between the container support (40) and the support hinge (42) to allow the container support (40) to disconnect from the armrest (10) in response to an excessive force, to prevent breakage of the hinge (42).

20 Claims, 7 Drawing Sheets

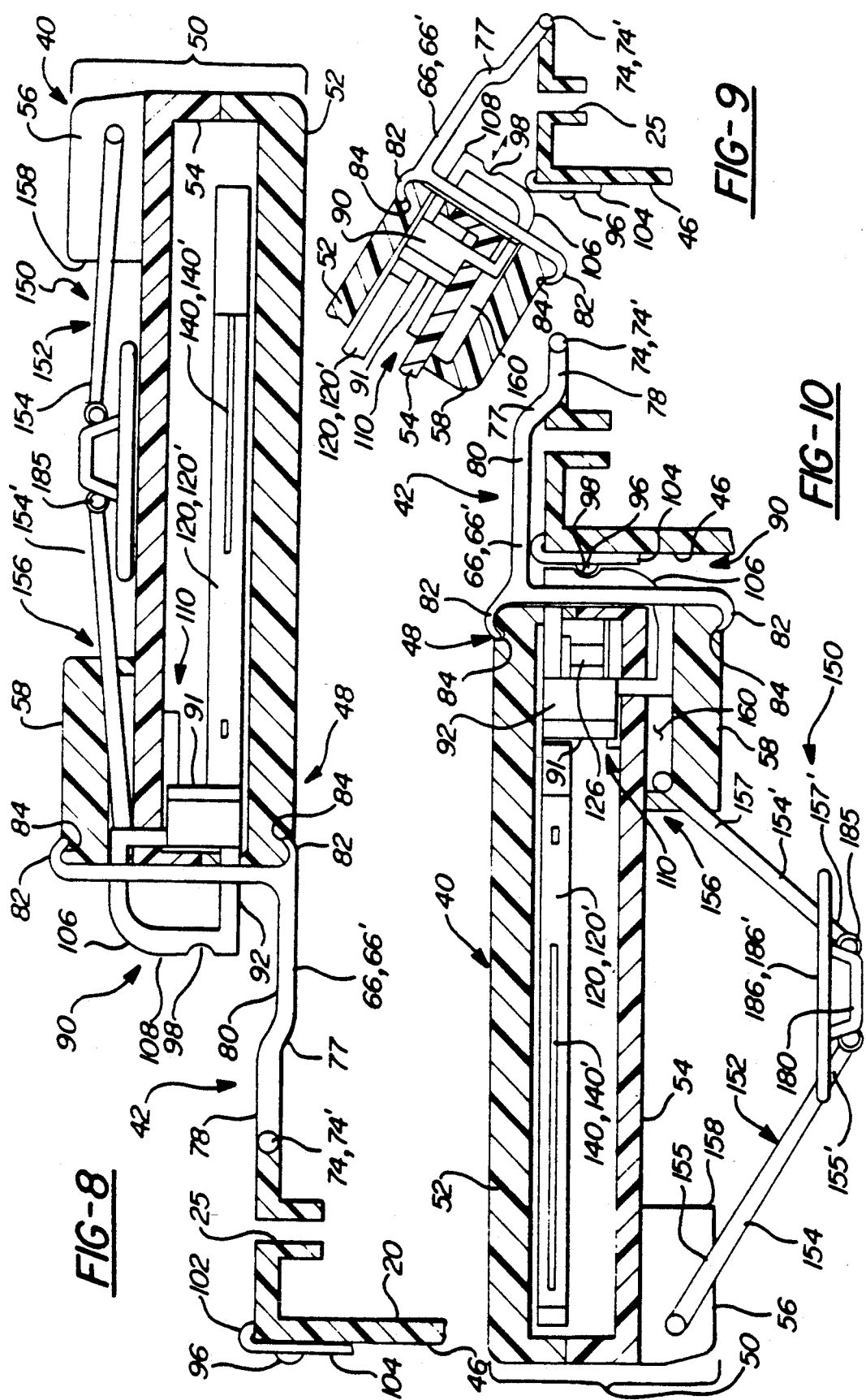

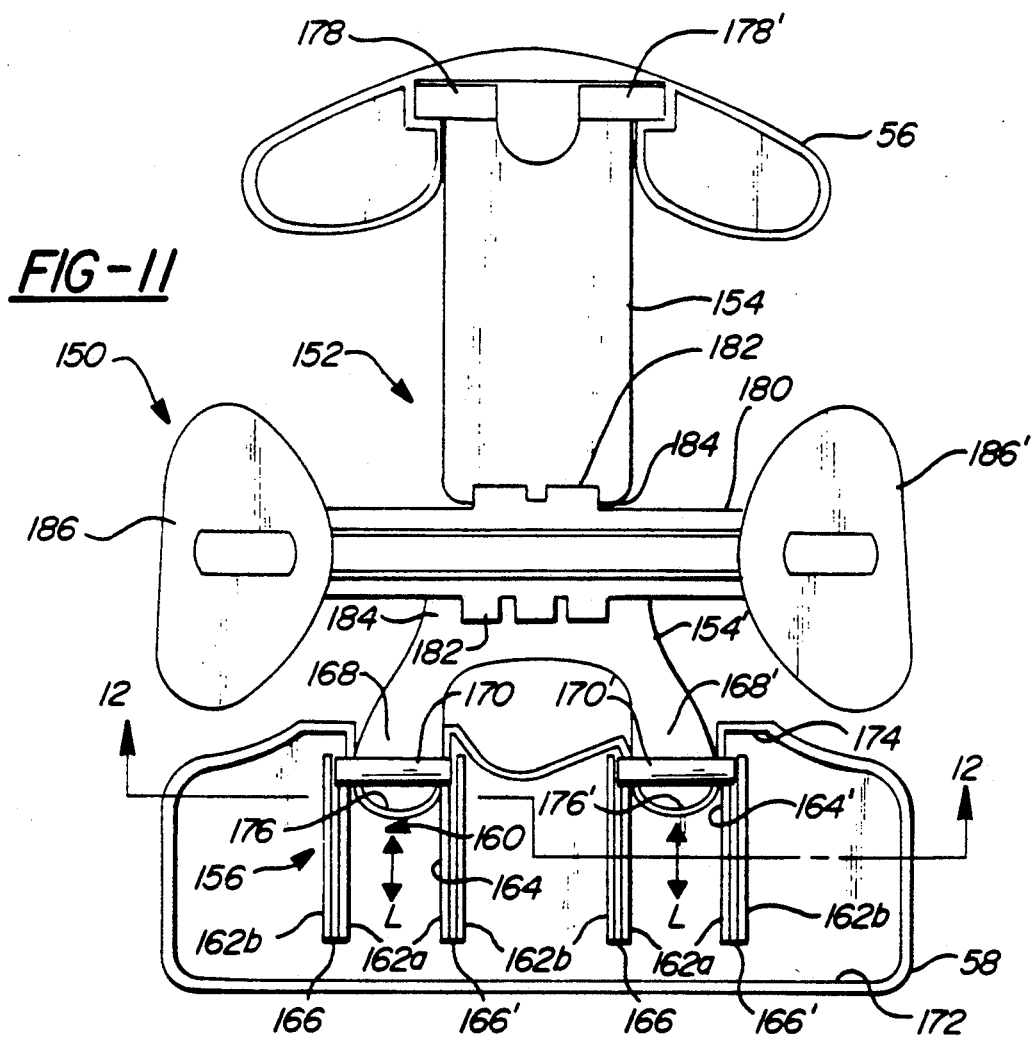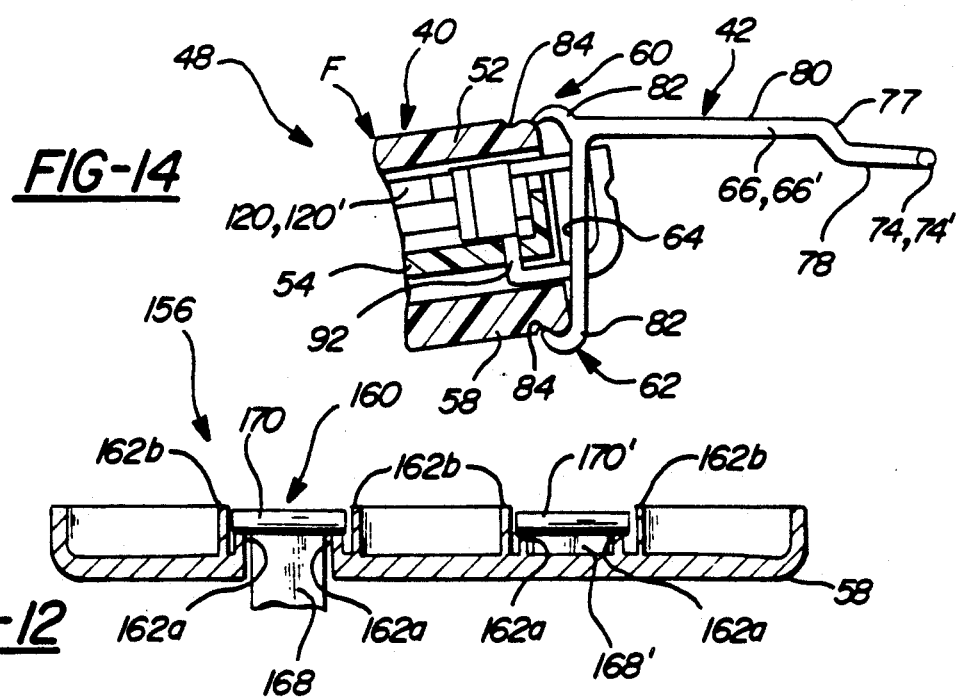

STORAGE ARMREST AND DRINK HOLDER WITH BREAKAWAY HINGE

FIELD OF THE INVENTION

The subject invention relates generally to a vehicle armrest assembly, and more specifically, to an armrest assembly having a container holder assembly releasably connected by a support hinge to the armrest.

DESCRIPTION OF THE RELATED ART

Frequently known in the art are vehicles having an armrest assembly mounted to a seat assembly to provide a comfortable forearm rest to the driver and/or passenger. The armrest commonly includes a container holder assembly for supporting a beverage container. Generally, the container holder assembly is connected to the armrest by a support, often a hinge support, so that the container may be pivoted between a use position extending from the armrest and a stored position received in the armrest.

For example, U.S. Pat. No. 4,943,111 to VanderLaon, issued Jul. 24, 1990, discloses a container holder assembly for a vehicle armrest. The container holder assembly includes a pair of arms or hinges extending from the holder and connecting with the armrest. The arms are received in slots formed in the front wall of the armrest and rest or are support by a flange on the front wall. The arms include tabs which slideably lock the arms in the slots. The container holder may be pivoted about the flange of the front wall between a use position extended outwardly from the front wall and a stored position received in a compartment formed in the armrest. Although the tabs may be manually released from the slots to disconnect the container holder from the armrest, there is no means to allow the container holder to automatically disconnect from the arms. In other words, should an excessive force be applied to the container holder, a resulting failure in the arms, holder or possibly the armrest could occur.

Thus, it is desirable to provide a container holder assembly which will automatically release from the armrest in response to an excessive force being applied thereto. Further, it is desirable that the container holder assembly be able to reconnect to the armrest for further use.

SUMMARY OF THE INVENTION

In accordance with the present invention, there is provided a beverage container holder assembly for a vehicle comprising container support means for supporting at least one beverage container, an armrest having a compartment for receiving the container support means in a stored position and support hinge means hingedly connecting the container support means to the armrest for movement of the container support means between the stored position and an extended operational position. The assembly is characterized by including disconnect means for disconnecting the container support means from the armrest in response to a predetermined excessive force applied to the container support means.

BRIEF DESCRIPTION OF THE DRAWINGS

Other advantages of the present invention will be readily appreciated as the same becomes better understood by reference to the following detailed description when considered in connection with the accompanying drawings wherein:

FIG. 8 is a partial cross-sectional view of the beverage container holder assembly as taken along lines 8—8 of FIG. 5;

FIG. 9 is a partial cross-sectional view of the beverage container assembly as taken in rotation from the stored position of FIG. 5 to the extended operational position of FIG. 4;

FIG. 10 is a partial cross-sectional view of the beverage container holder assembly as taken along lines 10—10 of FIG. 4;

FIG. 11 is a sectional view of the floor support means as taken along line 11—11 of FIG. 3;

FIG. 12 is a cross-sectional view of a floor extending means as taken along line 12—12 of FIG. 11;

FIG. 14 is a partial side view of the disconnect means of the subject invention of FIG. 1.

DETAILED DESCRIPTION OF THE PREFERRED EMBODIMENT

Figure 1:
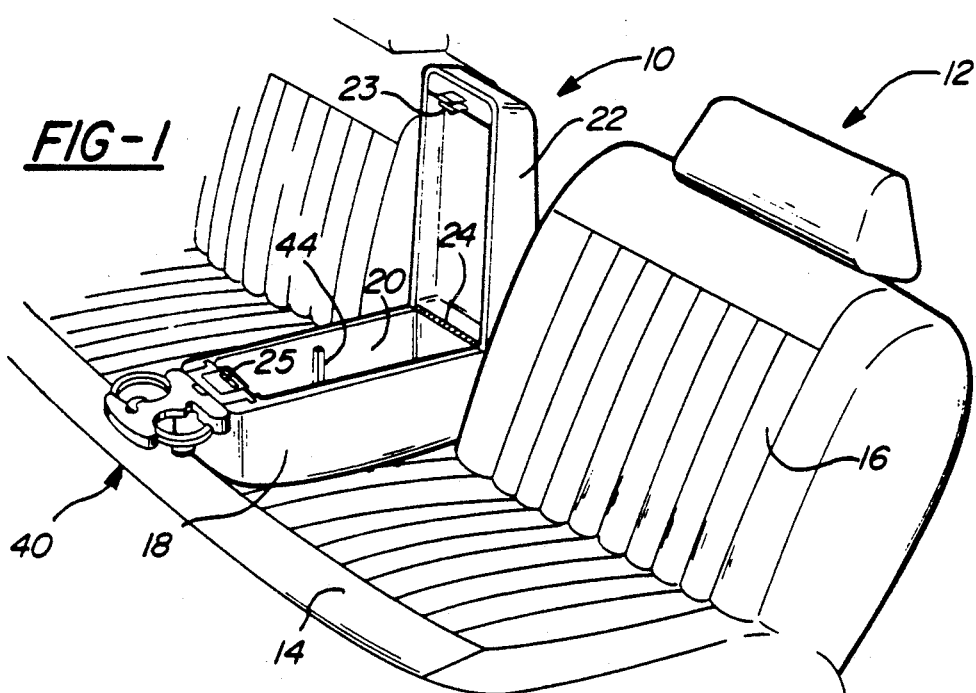
FIG. 1 is a perspective view of the subject invention disposed for use with a vehicle seat assembly.

Referring to the Figures wherein like numerals indicate like or corresponding parts throughout the several views, a vehicle seat armrest assembly is generally shown at 10 in FIG. 1. The armrest assembly 10 is generally mounted in association with a vehicle seat assembly as shown at 12. The assembly 12 generally includes a horizontal seat portion 14 and a generally vertical backrest portion 16. The seat armrest assembly 10 is generally mounted between two back portions 16 and pivotal between a generally horizontal position parallel with the seat portion 14 and a generally vertical position parallel to the back portion 16.

Figure 2:
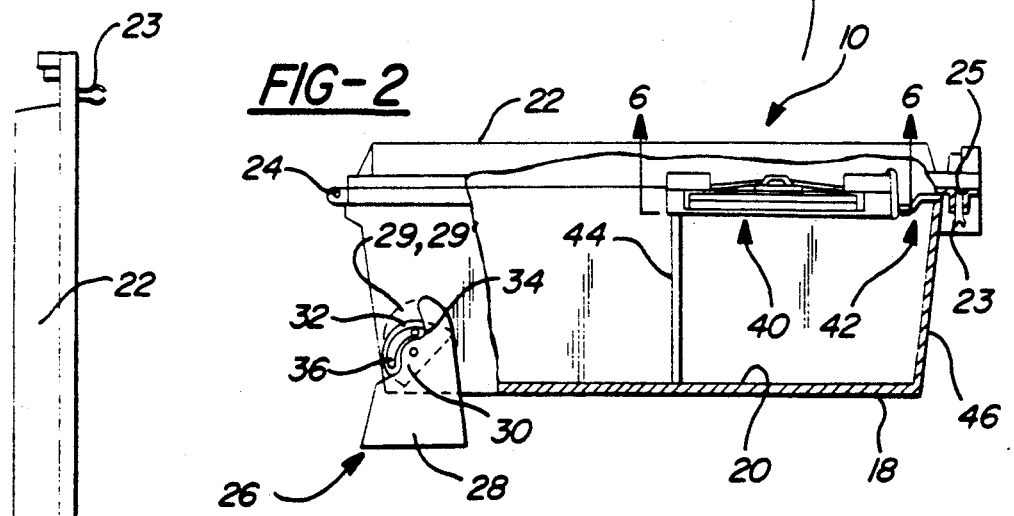
FIG. 2 is a side elevation view of the subject invention shown in partial cross section.
Figure 3:
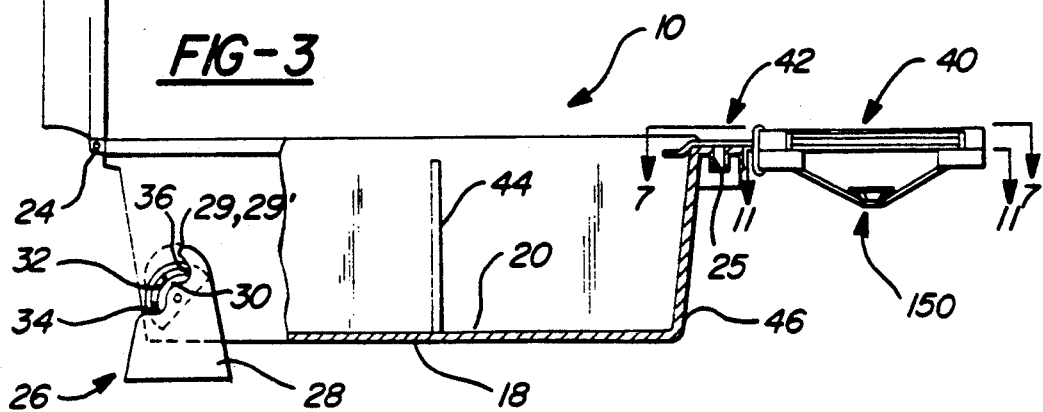
FIG. 3 is a side elevation view of the subject invention as shown in FIG. 2 and showing a beverage container holder assembly in an extended operational position and a cover of an armrest assembly in an open position.

As shown in FIGS. 2 and 3, the seat armrest assembly 10 is generally of molded plastic material and includes a lower bin 18 defining a storage compartment 20 therein. The armrest 10 further includes an upper cover 22 for covering the lower bin 18 and a cover hinge means 24 hinging the cover 22 to the bin 18 for providing pivotal movement of the cover 22 relative to the bin 18 between a closed position covering the bin 18, as shown in FIG. 2, and an open position opening the storage compartment 20, as shown in FIG. 3. The cover 22 includes a latch 23 extending outwardly therefrom and received in an aperture 25 in the lower bin 18. The latch 23 secures the cover 22 to the bin 18 in a latched position covering the storage compartment 20, FIG. 2, and provides access to the compartment 20 in an unlatched position, FIG. 3.

The armrest 10 is mounted to the seat assembly 12 by bracket means 26. The bracket means 26 pivotally supports the lower bin 18 and provides rotation of the armrest 10 between a horizontal use position, generally parallel to the seat portion 14, and a vertical storage position, generally parallel to the backrest portion 16. The bracket means 26 generally includes a frame 28 extending on opposite sides of the lower bin 18. The frame 28 includes support portions 29, 29' disposed adjacent each side of the bin 18 and a guide member 30 seated in each support portion 29, 29' between the frame 28 and the side of the bin 18. The guide member 30 comprises an arcuate slot 32 and the bin includes a guide pin 34 extending outwardly therefrom and seated in the slot 32 of the guide member 30 to rotatably guide the armrest 10 between the horizontal use position and the vertical storage position. The guide member 30 and guide pin 34 effectively establish the limits of travel for the armrest assembly 10. In order for the user to recognize the two positions of the armrest 10, opposites ends of the arcuate slot 32 are formed with enlarged openings 36. The guide pin 34 is dimensioned so as to loosely fit into the enlarged openings 36 at each end of the arcuate slot 32 and tightly fit in the central regions of the slot 32 to provide feedback of a stopping point upon reaching the vertical or horizontal positions of the armrest 10.

Figure 4:
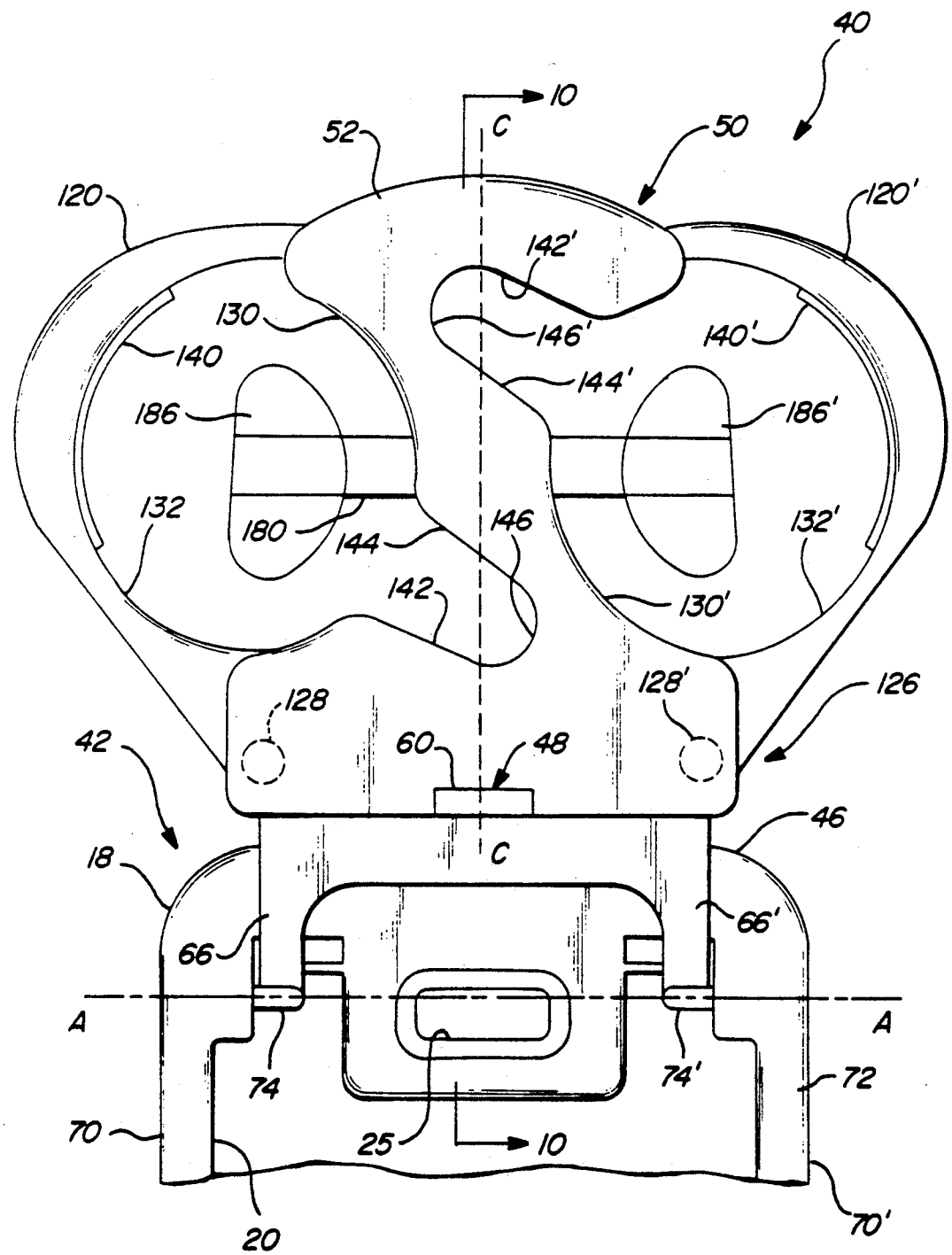
FIG. 4 is a top view of the beverage container holder assembly in the extended operational position.
Figure 5:
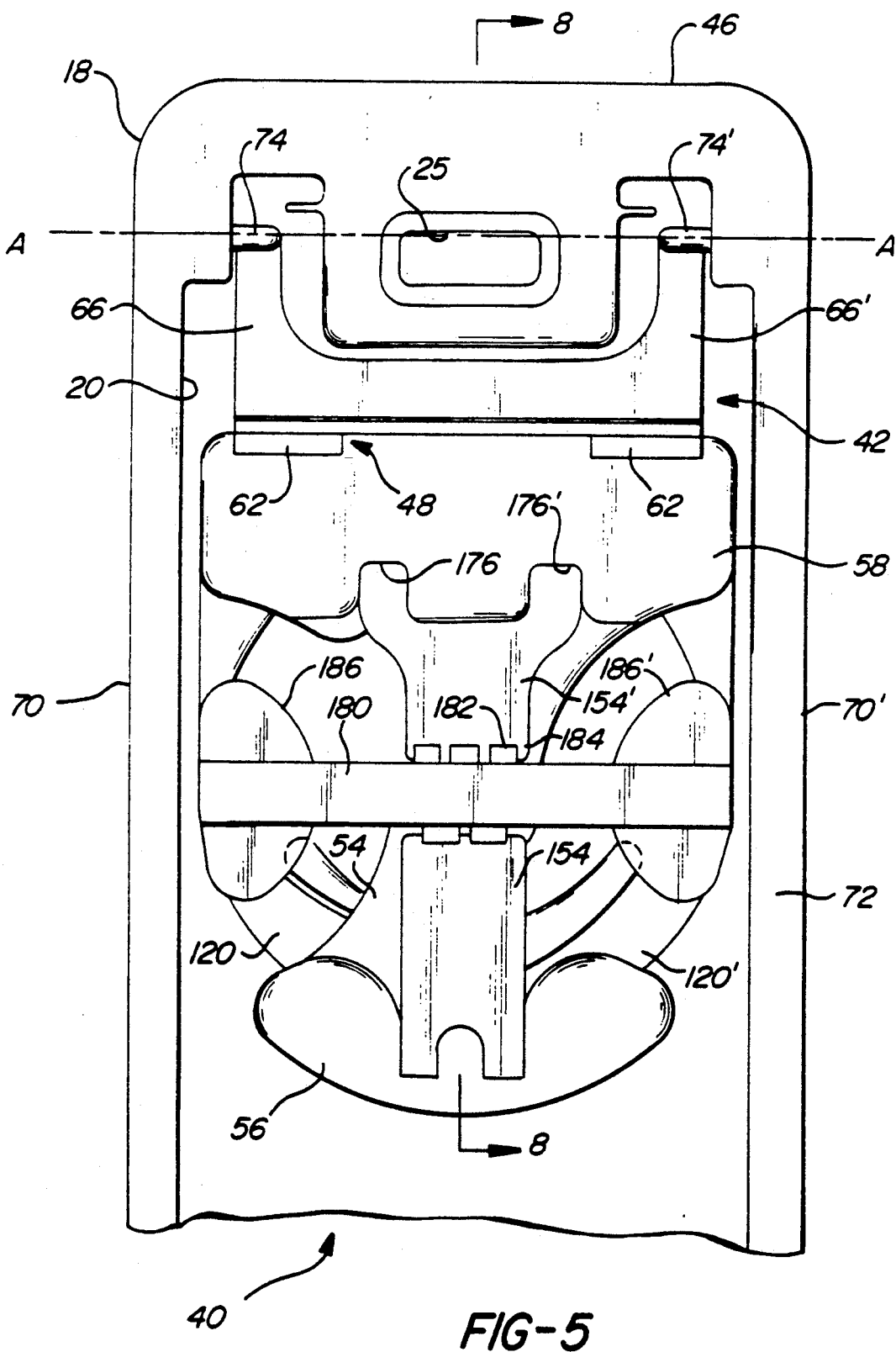
FIG. 5 is a top view of the subject invention as shown in FIG. 4 and showing the beverage container holder assembly in a stored position.
Figure 13:
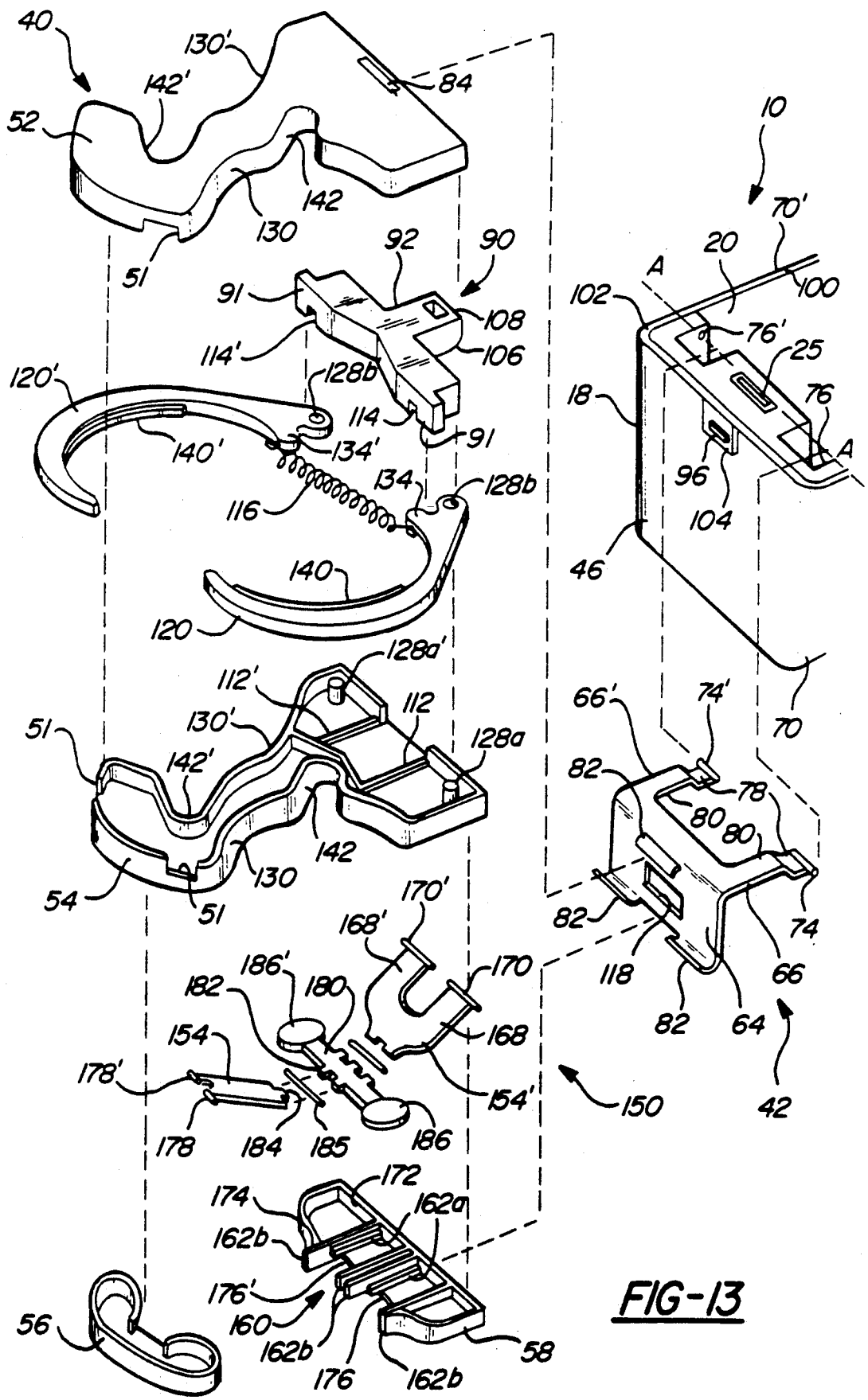
FIG. 13 is an exploded perspective view of the beverage container holder assembly.

Further shown in FIGS. 2 and 3, the seat armrest assembly 10 includes a container holder assembly comprising container support means 40 for supporting at least one beverage container, i.e., a soft drink can or bottle, coffee cup, or the like. The container support means 40 is hingedly connected to the lower bin 18 of the armrest 10 by support hinge means 42. The support hinge means 42 provides pivotal movement of the container support means 40 between a stored position received in the storage compartment 20, as shown in FIG. 2, and an extended operational position outside of the armrest 10 as shown in FIG. 3. As shown in FIG. 2, the armrest 10 includes a portion of a wall 44 inside the compartment 20 forming a stop or support for the container support means 40 in the stored position. As shown in FIG. 3, the container support means 40 extends outwardly from a front wall 46 of the lower bin 18 and is generally parallel to the level of the armrest 10 in the horizontal use position. Referring to FIGS. 4, 5 and 13, the support hinge means 42 defines a hinge axis A—A, as shown by a dashed line, generally transverse to the longitudinal length of the armrest 10. The container support means 40 rotates in a vertical plane about the hinge axis A—A between the stored position and the extended operational position.

The container support means is characterized by including disconnect means 48 for disconnecting the container support means 40 from the armrest 10 in response to a predetermined excessive force (F) applied to the container support means 40. More specifically, the disconnect means 48 disconnects the container support means 40 from the support hinge means 42, however, it will be appreciated that the disconnect means 48 could be placed between the support hinge means 42 and the lower bin 18 and the armrest 10. As shown in the preferred embodiment, the disconnect means 48 is disposed between the support hinge means 42 and the container support means 40 and allows the container support means 40 to disconnect from the support hinge means 42 in both the extended operational position and the storage position if an excessive force (F) is applied to the container support means 40.

The container support means 40 includes a base portion 50 having a top cover 52, a center support plate 54 and first and second bottom covers 56, 58. The disconnect means 48 includes first 60 and second 62 disconnects. As best shown in FIGS. 13 and 14 the first disconnect 60 releasably connects to the top cover 52 and the second disconnect 62 releasably connects to the second bottom cover 58. The support hinge means 42 comprises a front support plate 64 and a pair of hinge arms 66, 66' extending outwardly from the front support plate 64 for pivotal connection to the armrest 10. The support plate 64 and hinge arm 66, 66' interconnect at a generally 90° angle thus defining the supporting hinge means 42 as further having a generally L-shaped cross-section taken in a plane transverse to the hinge axis A—A.

The lower bin 18 of the armrest assembly 10 further includes a back wall 68, side walls 70, 70' and a front wall 46 for defining an upper periphery 72, generally rectangular in shape, about the storage compartment 20. The hinge arms 66, 66' include outwardly extending pivot pins 74, 74' which are received in respective pin openings 76, 76', spaced below the upper periphery 72 on each of the side walls 70, 70' within the storage compartment 20.

The hinge arms 66, 66' have a generally L-shaped step portion 77 including a lower step portion 78 and an upper step portion 80. The lower step portion 78 allows the hinge arms 66, 66' to extend below the upper periphery 72 for inserting the pivot pins 74, 74' into the pin openings 76, 76'. The upper step portion 80 extends upwardly to the level of the upper periphery 72 and rests, or is supported by, the front wall 46 of the lower bin 18 in the extended operational position. Further, the support plate 64 is positioned adjacent and generally parallel to the front wall 46 outside of the lower bin 18. The step portion 76 allows for compact storage of the container support means 40 within the storage compartment 20 of the armrest assembly 10 by positioning the container support means 40 partially below the level of the upper periphery 72 of the lower bin 18 within the storage compartment 20.

As best shown in FIG. 13, the first and second disconnects 60, 62 include at least one resilient tab 82 and at least one groove 84 for receiving the tabs 82 and interconnecting the support hinge means 42 and the container support means 40. As shown best in FIGS. 4, 5 and 13, the resilient tabs 82 extend generally outwardly from the support plate 64 of the support hinge means 42. The tabs 82 are generally semi-tubular in shape, that is, they have a longitudinal arc which forms approximately half of a tube. The grooves 84 are disposed as longitudinal channels in the top cover 52 and the second bottom cover 56. As shown, the first disconnect 60 includes one tab 82 extending outwardly from the support plate 64 and received and releasably connected to a groove 84 disposed in the top cover 52 of the base portion 50. Similarly, two tabs 82, spaced apart on the bottom portion of the support plate 64, extending and are releasably connected to respective grooves 84 on the second bottom cover 58 of the base portion 50. It will be appreciated that the number of tabs 82 and corresponding grooves 84 may differ than as shown.

In operation, as shown in FIG. 14, the disconnect means 48 allows the container support means 40 to releasably disconnect from the support hinge means 42 in any position from the stored position within the storage compartment 20 to the extended operational position outside of the compartment 20. If an excessive force (F) is applied to the container support means 40 which is greater than the resistivity of the resilient tabs 82, the tabs 82 will flex outwardly and be released from the grooves 84 in the top 52 or bottom 58 covers. The disconnect means 48 prevents breakage of the pivot pins 74, 74' or other portions of the support hinge means 42. Furthermore, the container support means 40 may be reconnected to the support hinge means 42 by reconnecting the tabs 82 into their respective grooves 84.

As shown in FIGS. 7-10, the container support means 40 is further characterized by including support locking means 90 for automatically locking the container support means 40 in the extended operational position in response to rotation of the container support means 40 from the stored position to the extended operational position. The support locking means 90 includes a guide means 92 coacting with a portion of the front wall 46 of the lower bin 18. The support locking means 90 locks the container support means 40 in the extended operational position, extending outwardly from the front wall 46 of the lower bin 18, irrespective of the position of the top cover 52. The support locking means 90 further includes detent means 94 disposed between the guide means 92 and the front wall 46 of the lower bin 18 for interlocking the guide means 92 of the container support means 40 with the front wall 46 of the lower bin 18 in the extended operational position. The detent means 94 includes a male protrusion 96 and a female detent 98. The male protrusion extends outwardly from the portion of the front wall 46 and is received in the female detent disposed in a portion of the guide means 92.

The lower bin 18 of the armrest assembly 10 includes a U-shaped channel 100 formed about the upper periphery 72. Generally, foam padding and a covering (not shown) are disposed about the exterior of the lower bin 18 and placed in the channel 100. Similarly, the foam padding and covering is further extended about the upper cover 22 and similarly disposed in a channel. The padding and covering provides a cushioning to the exterior of the armrest 10 for prolonged use in support of the users forearm. The covering is interlockingly engaged in the channel 100 by a retainer means 102. The retainer means 102 is generally rectangular in cross section and is seated in the U-shaped channel 100 and includes tabs and pins (not shown) for interlocking with the covering and further locking the container means 102 in the channel 100. The retainer means 102 is more specifically described in the co-pending application Ser. No. 592,250, filed Oct. 3, 1990, titled "Retainer Ring For Armrest Trim" and assigned to the assignee of the subject invention.

A locking plate 104 extends downwardly from the retainer means 102 on the outside portion of the front wall 46 of the lower bin 18 and abuts against the front wall 46. The locking plate 104 is generally rectangular in shape and disposes a small portion in the upper center of the front wall 46. The guide means 92 is slidably coupled to the container support means 90 for guiding the guide means 92 axially along the container support means 40 upon rotation of the container support means 40 from the stored position to the extended operational position. The guide means 92 includes a guide plate 108 which coacts with the locking plate 104 upon the interaction between the guide means 92 and the front wall 46 of the lower bin 18.

The male protrusion 96 of the detent means 94 extends outwardly from the locking plate 104 and is received in the female detent 98 which is disposed in the guide plate 108 to lock the guide means 92 to the lower bin 18 in the extended operational position.

As will be appreciated, as the container support means 40 rotates from the stored position within the storage compartment to the extended operational position, a positive contact between the guide means 92 and a portion of the lower bin 18 must be established. Such positive contact is provided by the guide means 92 including a track means 110 for slidably coupling the guide means 92 to the base portion 50 of the container support means 40. The track means 110 provides axial extending movement of the guide means 92 along the base portion 50 in response to the rotational movement of the container support means 40 from the stored position to the extended operational position. The track means 110 includes a pair of generally rectangular rails 112, 112' extending axially along a portion of the center support plate 54 of the base portion 50. The rails 112, 112' are spaced apart and generally parallel. The track means 110 further includes a pair of slots 114, 114' disposed in the guide means 92 and corresponding and receiving the respective rails 112, 112'. The support locking means 90 further includes spring bias means 116, commonly a coil spring, for urging the guide means 92 against the locking plate 104 and maintaining the container support means 40 in the extended operational position. The spring bias means 116 will be more specifically described below.

The guide means 92, as shown in FIG. 10, is positioned between the top cover 52 and the center support plate 54. The guide plate 108 extends through an aperture 118 in the support hinge means 42, to coact with the locking plate 104.

In operation, as shown in sequence in FIGS. 8-10, FIG. 8 shows the container support means 40 in the stored position inside the storage compartment 20 and the support locking means 90 in an unlocked position. Turning to FIG. 9, as the container support means 40 is rotated from the storage position, about the hinge axis A—A, toward the extended operational position, an arcuate surface 106 on the guide plate 108 contacts with an upper smooth surface of the locking plate 104 and actuates the guide means 92. Continuing rotation, extends the guide means 92, by way of the extending track means 110, axially along the base portion 50 of the container support means 40. The spring bias means 116 urges the guide means 92 against the locking plate 104 to provide feedback to the user of the positive contact therebetween. Upon reaching the extended operational position, the male protrusion 96 of the guide plate 108 is received in the female detent 98 of the locking plate 104 to engage the detent means 94. The spring bias means 116 maintains the guide means 92 in contact with the locking plate 104 and thus, the container support means 40 in the extended operational position until a predetermined force is applied by the user to overcome the spring bias means 116. It will be noted that the support locking means 90 is activated regardless of the position of the upper cover 22 with respect to the lower bin 18. That is, the support locking means 90 provides a lock between the container support means 40 and the lower bin 18 even when the upper cover 22 is in the open position opening the storage compartment 20.

Figure 6:
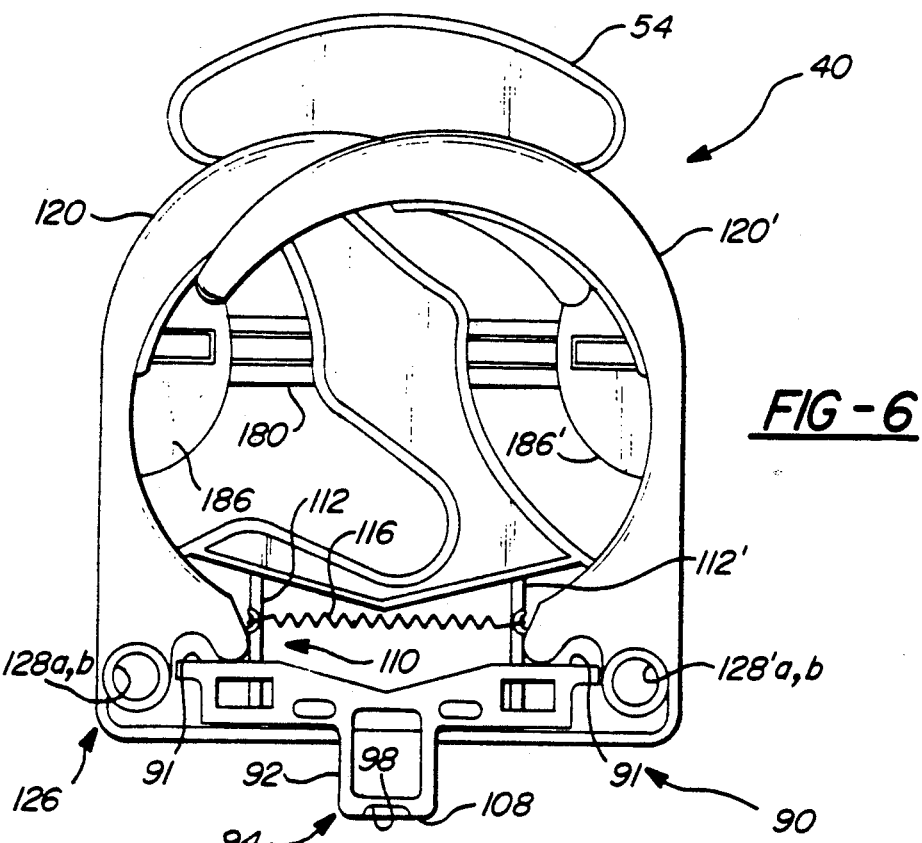
FIG. 6 is a top view of the beverage container holder assembly as taken along lines 6—6 of FIG. 2 with the top cover removed.
Figure 7:
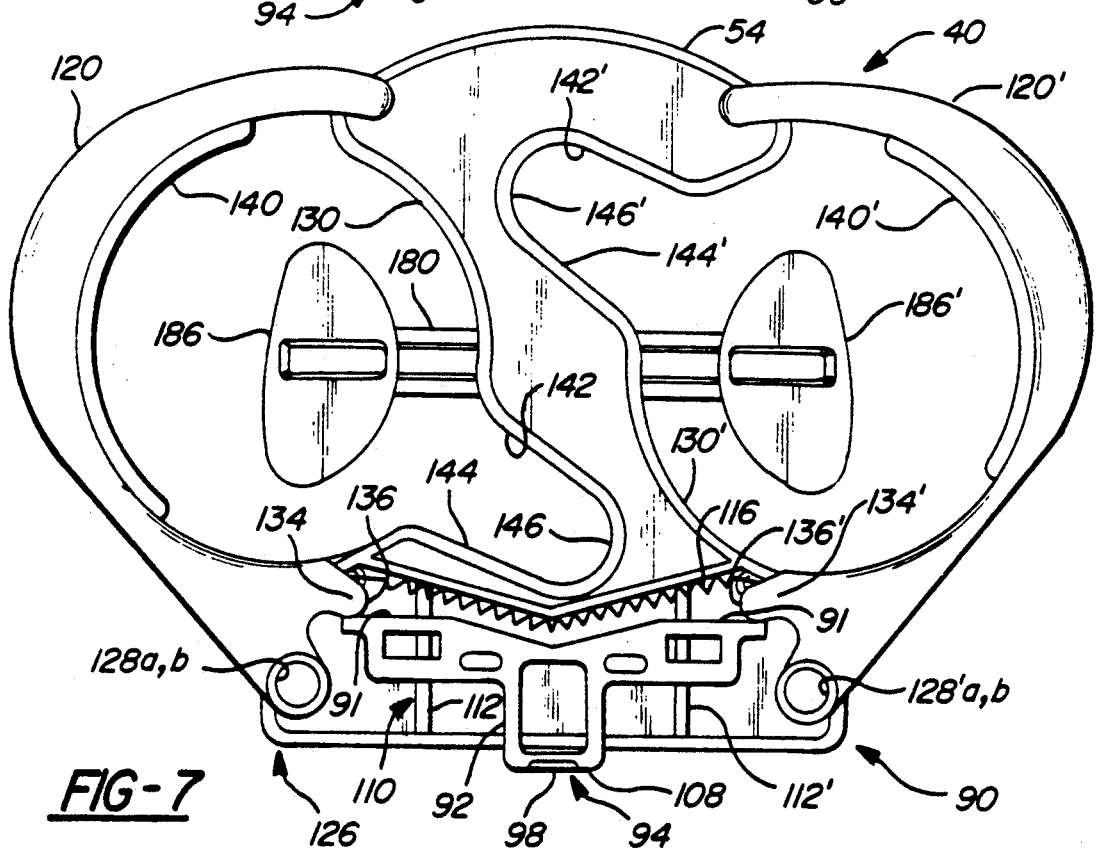
FIG. 7 is a top view of the beverage container holder assembly as taken along lines 7—7 of FIG. 3 with the top cover removed.

The container support means 40 further includes a pair of articulated arms 120, 120' for surrounding and stabilizing at least a portion of a container. The guide means 92 further extends the arms 120, 120' from a retracted overlapping position as shown in FIG. 6 to predetermined extended positions for receiving the container as shown in FIG. 7. The spring bias means 116 interconnects the arms 120, 120' for urging the arms 120, 120' together and into abutment with the guide means 92. The spring bias means 116 further continuously urges the arms 120, 120' toward the retracted overlapping position.

The arms 120, 120' are characterized by including pivot means 126 supporting the arms 120, 120' for allowing infinite pivotal movement of the arms 120, 120' independently of one another and beyond the respective predetermined positions and away from the guide means 92 for surrounding of stabilizing larger containers. The pivot means 126 includes first and second pivot rods 128a, 128a' received in respective pivot openings 128b, 128b' for the respective arm 120, 120' for pivotally coupling the arms 120, 120' to the base portion 50 of the container support means 40.

The base portion 50 of the container support means 40 includes first and second arcuate sides 130, 130'. The arms 120, 120' extend on opposite sides 130, 130' of the base portion 50 to define first and second container openings 132, 132' for receiving the container. The base portion 50 further includes openings 51 in the top cover 52 and center support plate 54 to allow the arms 120, 120' to be partially enclosed within the base portion 50 and a portion of the arms 120, 120' to overlap, as shown in FIG. 6, in the retracted position.

As shown in FIGS. 6-10, the guide means 92 automatically extends the arms 120, 120' from the retracted overlapping position to the predetermined extended position in response to rotation of the container support means 40 about the hinge axis A—A from the stored position within the storage compartment 20 to the extended operational position.

Turning to FIGS. 6 and 7, each of the arms 120, 120' includes a finger 134, 134' having a smooth curved outer surface 136 in sliding contact with a front face 91 of the guide means 92. The fingers 134, 134' are interconnected by opposite ends of the spring bias means 116 and are thus urged together and toward the retracted overlapping position. Furthermore, the fingers 134, 134' are urged toward contact with the guide means 92 by the spring bias means 116. The arms 120, 120' are pivotally connected by the pivot means 126 to the center support plate 54 of the base portion 50 between the top cover 52 and the first and second bottom covers 56, 58.

The guide means 92 includes track means 110, as previous described, to further provide the automatic slidable extension of the guide means 92 along the base portion 50. More specifically, the pair of slots 114, 114' disposed in the guide means 92 and the pair of rails 112, 112' fixed to the center support plate 54, received in the slots 114, 114', provide axial sliding motion between the guide means 92 and the base portion 50.

In operation, upon rotation of the container support means 40 from the stored position to the extended operational position, the guide means 92 contacts with a portion of the front wall 46 of the lower bin 18 as previously described and actuates the track means 110. The guide means 92 slides axially along the center support plate 54 by way of the track means 110 and presses the arm fingers 134, 134' forwardly and outwardly. The fingers 134, 134' remain in biased contact with the front face 91 of the guide means 92 due to the spring bias means 116. The guide means 92 continues along the track means 110 until the container support means 40 reaches the extended operational position and thus the arms 120, 120' reach the predetermined extended position.

In this position, it is important to recognize, that the pivot means 126 allows each arm 120, 120' to independently extend beyond the predetermined position to receive a larger container. Upon extension of one of the arm 120, 120' beyond the predetermined position, the respective finger 134, 134' loses contact with the front face 91 of the guide means 92, however, the spring bias means 116 still urges the arm 120, 120' toward the predetermined position and the finger 134, 134' toward the guide means 92. Thus, the pivot means 126 allows for different size containers to be inserted within the container openings 132, 132' independent of one another. The arms 120, 120' further include arcuate bumpers 140, 140' about a portion of the inner surface of the arm 120, 120', commonly of a resilient material, to provide cushioning and support to the containers.

The first and second container openings, 132, 132' are disposed on opposite sides of a central axis C—C, as shown best in FIG. 4. The container support means 40 further defines a slot 142, 142' extending radially from each of the openings 132, 132' for receiving a handle of the container. The container support means 40 is further characterized by the slots 142, 142' extending across the central axis C—C to overlap one another. The slots 142, 142' are further defined by being spaced apart and generally parallel to one another. Further, the central axis C—C is spaced between first and second sides 130, 130' of the base portion 50 and the slots 142, 142' extend radially opposite their respective arms 120, 120'. The slots 142, 142' extend at least partially transverse to the central axis C—C. The central axis C—C may further be defined as being transverse to the hinge axis A—A defined by the support hinge means 42 supporting the container support means 40.

The slots 142, 142' include an elongated straight channel portion 144 with an arcuate end 146. Each slot 142, 142' is positioned on the container support means 40 extending away from the user to allow for readily excessible grasp by the user of the container handle in a somewhat natural grasping position. Furthermore, the slots 142, 142' extend across the central axis C—C and overlap one another, or more specifically, overlap a common area between the first and second arcuate sides 130, 130' so as to minimize the width of the container support means 40 and decrease storage use in the storage compartment 20. That is, there is a limited amount of space available for storage in the armrest 10, therefore, the dimensions of the container holder needs to be minimized to provide compact storage while maintaining adequate support. It will be appreciated that the slots 142, 142' may be aligned in various overlapping positions across the central axis C—C to provide the same result.

The container support means 40 further comprises floor support means 150 for supporting the bottom of the containers. Linkage means 152 link the floor support means 150 to the container support means 40 and include first and second linkages 154, 154'. The floor support means 150 is characterized by including floor extending means 156 slidably coupling at least one of the first 154 or second 154' linkages to the container support means 40 for automatically extending the floor support means 150 from a retracted position, adjacent the container support means 40, as shown in FIG. 8, to an extended support position, FIG. 10, spaced a predetermined distance below the container support means 40. The floor extending means 156 is extended in response to a gravitational force applied to the floor support means 150 upon rotational movement of the container support means 40 from the stored position within the storage compartment 20 to the extended operational position.

As best shown in FIGS. 8-13, the floor support means 150 is disposed between first 154 and second 154' linkages. The first linkage 154 includes a first end 155 pivotally connected to the container support means 40 and a second end 155' pivotally connected to the floor support means 150. The second linkage 154' includes a first end 157 slidably coupled by the floor extending means 156 to the container support means 40 and a second end 157' pivotally connected to the floor support means 150. The floor support means 150 is further retracted into a floor compartment 158 disposed in the container support means 40 in the retracted position. The floor compartment 158, as best shown in FIG. 10, is disposed below the center support plate 54 and between the first 56 and second 58 bottom covers. Thus, when the floor support 150 is in the retracted position, the container support means 40 is compacted for storage in the storage compartment 20.

As best shown in FIG. 12, the floor extending means 156 comprises a floor track means 160 disposed between the second linkage 154 and the container support means 40. More specifically, the floor track means 160 is disposed along the second 58 bottom cover of the base portion 50. It will be appreciated that the floor track means 160 could likewise be disposed within the first 56 bottom cover or within the floor support means 150.

The floor track means 160 includes a plurality of rails 162 spaced apart a predetermined distance about the surface of the bottom cover 58 for receiving the linkage 154'. The rails 162 form first 164 and second 164' channels spaced apart and generally parallel to one another. Each channel 164, 164' comprises a first 166 and second 166' side, each composed of a pair of rails 162. Each side 166, 166' comprises two rails 162a, 162b, one having smaller dimensions than the other and forming a step like configuration in the side 166, 166'. As best shown in FIG. 12, the channels 164, 164' are comprised of the rails 162, having the smaller dimensioned rail 162a on the innermost portion of the channel 164, 164' and the larger dimensioned rail 162b forming the outer wall of the channel 164, 164'. The second linkage 154' includes a first 168 and second 168' arm, each including a generally tubular linkage pin 170, 170'. The pins 170, 170' are received in the first 164 and second 164' channel and slide along the rails 162 of the first 166 and second 166' sides. The linkage pins 170, 170' rest and slide along the surface of the smaller dimensioned or inner rails 162a and are maintained in the channels 164, 164' by the larger dimensioned or outer rails 162b. The linkage pins 170, 170' slide along the floor track means 160 axially along the base portion 50 as indicated by direction arrow L as shown in FIG. 11.

The second bottom cover 58 comprising the floor track means 160 includes a back wall 172 and a front wall 174. The front wall 174 includes a pair of arcuate openings 176, 176' to allow extension of the linkage arms 168, 168' upon extension from the retracted position to the extended support position. The linkage pins 170, 170' of the linkage 154' are in a rearward position adjacent the back wall 172 in the retracted position and extend forward along the floor track means 160 to a forward most position adjacent the front wall 174 in the extended support position.

Similarly, the first linkage 154 includes first 176 and second 176' arms each having a pivot pin 178, 178'. The pins 178, 178' are generally tubular in shape and pivotally couple the first linkage 154 to the first bottom cover 56 of the container support means 40. The opposite ends of the first 154 and second 154' linkages are pivotally connected to a main floor support beam 180 of the floor support means 150. As shown in FIG. 11, the pivotal connections between the linkages 154, 154' and the main floor support beam 80 generally include a plurality of pivotally interlocking male 182 and female 184 members interlocked by pivot rod 185. The floor support means 150 further includes first 186 and second 186' support platforms for supporting the beverage containers. The support platforms 186, 186' are interconnected by opposite ends of the main floor support beam 180. The support platforms 186, 186' are generally circular in shape to provide a stable platform for the support of the containers. However, it will be appreciated that the support platforms 186, 186' may be of any suitable shape and may differ in size to accommodate in supporting the container bottoms.

In operation, the floor support means 150 is in the retracted position seated in the floor compartment 158 with the container support means 40 in the storage position within the storage compartment as shown in FIG. 8. Upon rotation of the container support means 40 from the stored position to the extended operational position, as shown in FIGS. 9 and 10, the gravitational force applied to the floor support means 50 causes the floor extending means 156 to be actuated. The second linkage 154' having linkage pins 170, 170' slides along the rails 162 of the first 164 and second 164' channels from the rearward position to the forward position. The floor support means 150 pivots about the first 56 bottom cover along the first linkage 154 and the floor extending means 156 fully extends the floor support means 150 to the extended support position as shown in FIG. 10. In this position, beverage containers may be received within the container openings 132, 132' and supported on the support platforms 186, 186' and further surrounded and stabilized by the articulated arms 120, 120' and arcuate sides 130, 130' of the base portion 50.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A beverage container holder assembly for a vehicle comprising: container support means (40) for supporting at least one beverage container, an armrest (10) having a compartment (20) for receiving said container support means (40) in a stored position, support hinge means (42) hingedly connecting said container support means (40) to said armrest (10) for movement of said container support means (40) between said stored position and an extended operational position, said assembly characterized by including disconnect means (48) for disconnecting said container support means (40) from said armrest (10) in response to a predetermined excessive force applied to said container support means (40).

2. An assembly as set forth in claim 1 further characterized by said disconnect means (48) disposed between said support hinge means (42) and said container support means (40) for disconnecting said container support means (40) from said support hinge means (42).

3. An assembly as set forth in claim 2 further characterized by said disconnect means (48) including first (60), and second (62) disconnects disposed between said support hinge means (42) and said container support means (40).

4. An assembly as set forth in claim 3 further characterized by said container support means (40) including a base portion (50) having a top cover (52) and at least one bottom cover (56,58).

5. An assembly as set forth in claim 4 further characterized by said first disconnect (60) releasably connected to said top cover (52) and said second disconnect (62) releasably connected to one of said bottom covers (56,58).

6. An assembly as set forth in claim 5 further characterized by said first (60) and second (62) disconnects including at least one resilient tab (82) and at least one groove (84) for receiving said tabs (82) and interconnecting said support hinge means (42) and said container support means (40).

7. An assembly as set forth in claim 6 further characterized by said tabs (82) disposed on said support hinge means (42) and said grooves (84) disposed in said top (52) and said bottom cover (56,58).

8. An assembly as set forth in claim 7 further characterized by said support hinge means (42) pivotally connecting said container support means (40) to said armrest (10) and defining a hinge axis (A—A).

9. An assembly as set forth in claim 8 further characterized by said support hinge means (42) having a generally L-shaped cross-section taken in a plane transverse to said hinge axis (A—A).

10. An assembly as set forth in claim 9 further characterized by said support hinge means (42) including a support plate (64) and a pair of hinge arms (66,66') extending outwardly from said support plate (64) for pivotal connection to said armrest (10).

11. An assembly as set forth in claim 10 further characterized by said tabs (82) extending outwardly from said support plate (64).

12. An assembly as set forth in claim 11 further characterized by each of said hinge arms (66,66') including a pivot pin (74,74') and said armrest compartment (20) including pin openings (76,76') for receiving said pivot pins (74,74').

13. An assembly as set forth in claim 12 further characterized by said support hinge means (42) pivotally positioning said container support means (40) between said stored position inside said compartment (20) and said extended operational position outside of said armrest compartment (20).

14. An assembly as set forth in claim 13 further characterized by said armrest (10) including a lower bin (18) defining said compartment (20) and having a front wall (46), a back wall (68) and two side walls (70,70') defining an upper periphery (72) and said pin openings (76,76') spaced below said upper periphery (72) on each of said side walls (70,70') within said compartment (20).

15. An assembly as set forth in claim 14 further characterized by said hinge arms (66,66') having an L-shaped step portion (77) having a lower step (78) for extending said pivot pins (74,74') below said upper periphery (72) for inserting into said pin openings (76,76') and an upper step (8) for supporting said hinge arms (66,66') and said support hinge means (42) about said upper periphery (72) of said bin (18).

16. An assembly as set forth in claim 15 further characterized by said support plate (64) seated adjacent said front wall (46) outside of said bin (18) in said extended operational position.

17. An assembly as set forth in claim 16 further characterized by said armrest (10) including an upper cover (22) for covering said lower bin (18).

18. An assembly as set forth in claim 17 further characterized by said armrest (10) including a cover hinge means (24) hinging said cover (22) to said bin (18) for pivotal movement of said cover (22) relative to said bin (18) between a closed position covering said bin (18) and an open position opening said storage compartment (20).

19. An assembly as set forth in claim 18 further characterized by including bracket means (26) supporting said lower bin (18) for providing rotation of said bin (18) between a horizontal use position and a vertical storage position.

20. An assembly as set forth in claim 19 further characterized by including a latch (23) extending outwardly from the cover (22) and received in an aperture (25) in the lower bin (18) to secure the cover (22) to the bin (18) in a latched position and provide access to the storage compartment (20) in an unlatched position.

* * * * *